US009670813B2

(12) United States Patent
Winkler et al.

(10) Patent No.: US 9,670,813 B2
(45) Date of Patent: Jun. 6, 2017

(54) SUPPLY SYSTEM FOR A MEDIUM INTO AN EXHAUST SYSTEM

(71) Applicant: MTU Friedrichshafen GmbH, Friedrichshafen (DE)

(72) Inventors: Christian Winkler, Constance (DE); Holger Sinzenich, Markdorf (DE); Benjamin Sauter, Bermatingen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 14/807,116

(22) Filed: Jul. 23, 2015

(65) Prior Publication Data

US 2015/0322840 A1 Nov. 12, 2015

Related U.S. Application Data

(63) Continuation of application No. PCT/EP2013/003797, filed on Dec. 16, 2013.

(30) Foreign Application Priority Data

Jan. 30, 2013 (DE) ........................ 10 2013 201 537

(51) Int. Cl.
*F01N 3/00* (2006.01)
*F01N 3/20* (2006.01)

(52) U.S. Cl.
CPC ........ *F01N 3/2066* (2013.01); *F01N 2610/02* (2013.01); *F01N 2610/11* (2013.01);
(Continued)

(58) Field of Classification Search
CPC ........................... F01N 3/2066; F01N 2610/02
(Continued)

(56) References Cited

U.S. PATENT DOCUMENTS 8,978,361 B2 3/2015 Brück et al.
2007/0048204 A1 * 3/2007 Mital .................... B01D 53/90 423/239.1

(Continued)

FOREIGN PATENT DOCUMENTS

BE WO 2008006840 A1 * 1/2008 ........... F01N 3/2066
DE 198 47 388 A1 4/2000

(Continued)

OTHER PUBLICATIONS

International Search Report dated Feb. 21, 2014 for International Application No. PCT/EP2013/003797 (2 pages).

*Primary Examiner* — Jason Shanske
(74) *Attorney, Agent, or Firm* — Taylor IP, P.C.

(57) ABSTRACT

The invention relates to a supply system for a medium, in particular for an exhaust-gas purification apparatus for the treatment of exhaust gases of an internal combustion engine, having a storage vessel for the medium, having a dosing device for dosing the medium, and having a provision line which comprises a feed line for the supply of the medium to the dosing device and a return line for returning the medium from the dosing device into the storage vessel. Flow can pass through the dosing device from a feed port to a return port of the dosing device. The provision line comprises an additional fluid connection between the feed line and the return line. The additional fluid connection opens out into the feed line upstream of the feed port of the dosing device and opens out into the return line downstream of the return port of the dosing device.

14 Claims, 1 Drawing Sheet

(52) U.S. Cl.
CPC ................ *F01N 2610/1473* (2013.01); *F01N 2610/1486* (2013.01); *Y02T 10/24* (2013.01)

(58) Field of Classification Search
USPC ........................................................ 60/286
See application file for complete search history.

(56) References Cited

U.S. PATENT DOCUMENTS

| | | | | |
|---|---|---|---|---|
| 2008/0148716 | A1* | 6/2008 | Nishibu | F01N 3/2066 60/295 |
| 2009/0205316 | A1 | 8/2009 | Dougnier et al. | |
| 2010/0172763 | A1* | 7/2010 | Habumuremyi | F01N 3/208 417/32 |
| 2010/0319325 | A1* | 12/2010 | Reusing | F01N 3/36 60/286 |
| 2011/0083621 | A1* | 4/2011 | Ogunleye | F01N 3/208 123/41.02 |
| 2011/0139255 | A1* | 6/2011 | Gouriet | F01N 3/208 137/1 |
| 2012/0047880 | A1* | 3/2012 | Leonard | F01N 3/208 60/295 |
| 2012/0324891 | A1* | 12/2012 | Raab | F01K 3/10 60/668 |
| 2013/0104527 | A1 | 5/2013 | Liljestrand et al. | |

FOREIGN PATENT DOCUMENTS

| | | | |
|---|---|---|---|
| DE | 10 2004 046 881 | A1 | 4/2006 |
| DE | 298 25 250 | U1 | 3/2007 |
| EP | 1 656 986 | A1 | 5/2006 |

* cited by examiner

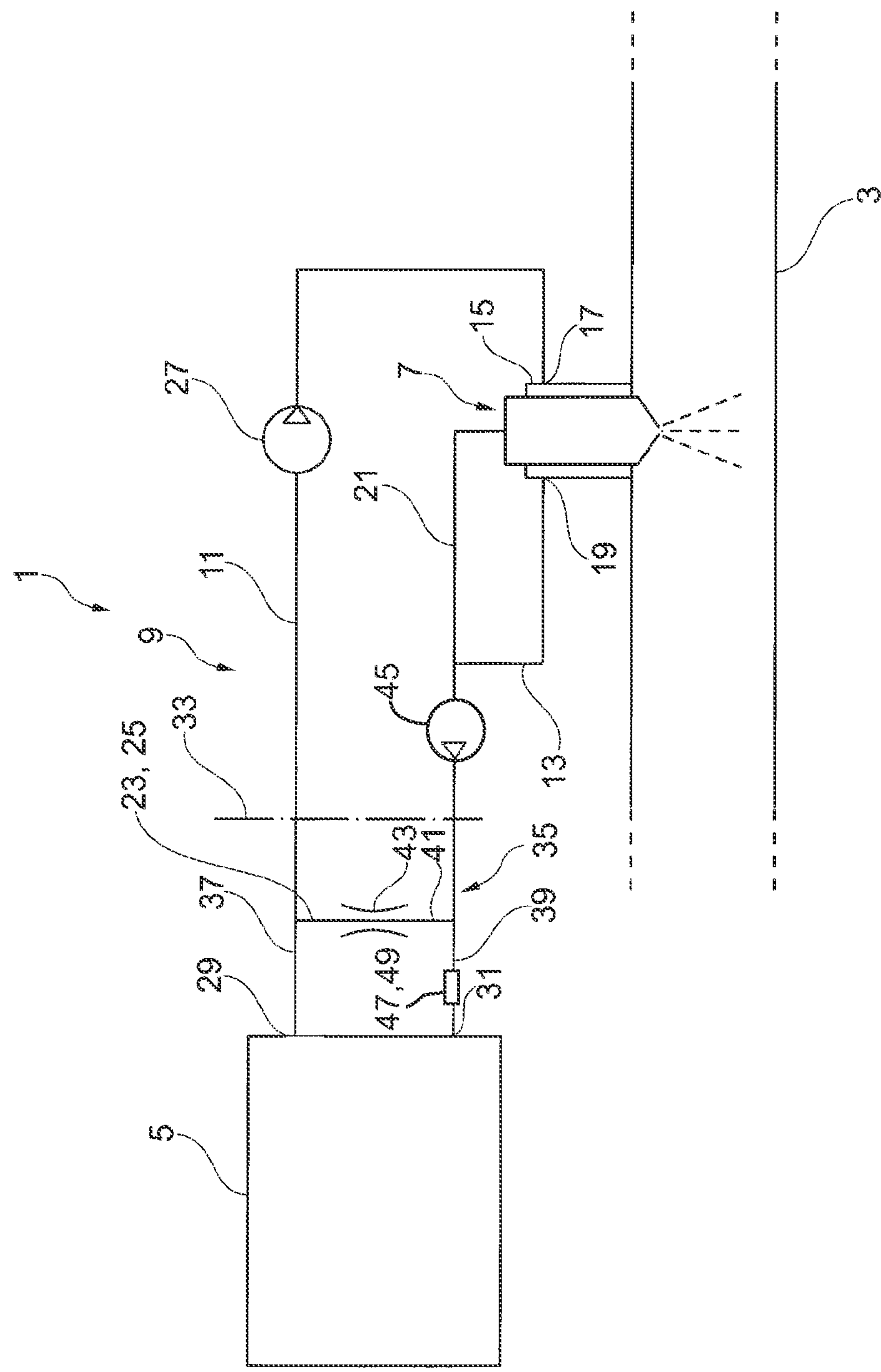
1
3
5
7
9
11
13
15
17
19
21
23, 25
27
29
31
33
35
37
39
41
43
45
47, 49

SUPPLY SYSTEM FOR A MEDIUM INTO AN EXHAUST SYSTEM

CROSS REFERENCE TO RELATED APPLICATIONS

This is a continuation of PCT application No. PCT/EP2013/003797, entitled "SUPPLY SYSTEM FOR SUPPLYING A REDUCING AGENT INTO AN EXHAUST SYSTEM", filed Dec. 16, 2013, which is incorporated herein by reference.

BACKGROUND OF THE INVENTION

1. Field of the Invention

The invention relates to a supply system for a medium, in particular, for an exhaust-gas purification apparatus for the treatment of exhaust gases of an internal combustion engine.

2. Description of the Related Art

Supply systems of the type discussed here are known. The German laid-open specification DE 10 2004 046 881 A1 has disclosed a supply system for an exhaust-gas purification apparatus for the treatment of exhaust gases of an internal combustion engine, which supply system comprises a storage vessel for the medium, a dosing device for dosing the medium into an exhaust line of an internal combustion engine, and a provision line. The provision line has a feed line which serves for the supply of the medium to the dosing device. The provision line also has a return line via which the medium can be returned from the dosing device into the storage vessel. Such supply systems are used in particular for the reduction of nitrogen oxides in exhaust gases of internal combustion engines. As medium, use is made in this case of a reducing agent which is supplied to the exhaust line upstream of a selective catalytic converter for performing a selective catalytic reduction. Preferably, in the selective catalytic converter, ammonia is converted with nitrogen oxides to form nitrogen and water, wherein it is typically the case that, before this, the ammonia is released by hydrolysis from the reducing agent that is injected in liquid form into the exhaust gas. As reducing agent, use is made in particular of a urea solution, typically an aqueous urea solution. To ensure reliable functioning of the dosing device, it is necessary, during the operation of the supply system, for the dosing device to be cooled because it is in contact with the hot exhaust gas or the hot exhaust line. For this purpose, in known supply systems, in particular in the supply system known from DE 10 2004 046 881 A1, it is provided that, during operation, the dosing device is flowed through by the medium, wherein the medium flows from a feed port of the dosing device to a return port of the dosing device.

In the case of supply systems of this type, there is the risk of the reducing agent, which is liquid under normal conditions, freezing in the presence of low ambient temperatures. This can result in damage, in particular to the dosing device. Numerous measures are known for preventing damage from being caused to the dosing device by freezing medium. In particular, DE 10 2004 046 881 A1 proposes a solution for ensuring firstly the best possible insulation of the supply system with regard to the freezing behavior of the medium and secondly the least possible insulation action for good heat dissipation. In the presence of low ambient temperatures, however, there is also the risk of the medium arranged in the storage vessel freezing. Since it is here that the largest volume of medium is typically present, it takes a particularly long time for the medium in the storage vessel to thaw out. During this time, it may be the case that a circuit for the medium along the provision line, which is necessary in particular for the cooling of the dosing device, comes to a standstill because it is blocked by frozen reducing agent in the storage vessel, in particular in the region of ports of the provision line to the storage vessel. It may therefore be the case that, under such operating conditions, in particular even when the medium in the provision line and in the dosing device has already thawed out, the dosing device is not adequately cooled because no medium can be conveyed through the dosing device. Damage to the dosing device owing to elevated thermal loading is then possible in particular because the reducing agent volume in the tank takes considerably longer to thaw out than the very much smaller volume in the provision line.

What is needed in the art is a supply system which does not exhibit the stated disadvantages.

SUMMARY OF THE INVENTION

The invention is based on the object of providing a supply system which does not exhibit the stated disadvantages, wherein in particular, damage as a result of elevated thermal loading in the event of a media circuit being blocked by frozen medium in the region of the storage vessel is prevented.

The supply system is characterized in that the provision line comprises an additional fluid connection between the feed line and the return line. The additional fluid connection opens out into the feed line upstream of the feed port of the dosing device and opens out into the return line downstream of the return port of the dosing device. If the media circuit comprising the storage vessel is blocked by frozen medium present in the storage vessel or in the region of the connectors of the provision line to the provision vessel, it is nevertheless possible for medium for cooling the dosing device to be conducted in a circuit along the provision line, specifically via the additional fluid connection which connects the feed line to the return line. The circuit is then completed not by the storage vessel but by the additional fluid connection. Adequate cooling of the dosing device is thus ensured regardless of a thawing duration of a frozen medium volume present in the storage vessel, such that damage to the dosing device owing to thermal overloading is prevented in an effective manner. When the medium volume present in the storage vessel has finally also thawed out, the circuit of the medium can once again run via the storage vessel.

A supply system may be characterized in that the additional fluid connection is formed as a bypass line. Through this, the medium can be delivered along the provision line so as to bypass the storage vessel. The additional fluid connection accordingly constitutes a bypass which—as already described—is provided for completing a circuit of the medium for cooling the dosing device if the circuit that is otherwise provided is blocked by frozen medium in the region of the storage vessel. Under normal conditions, when all of the medium is liquid, the medium flows from the storage vessel via the feed line to the feed port of the dosing device, flows through the dosing device for cooling purposes, and enters the return line through the return port of the dosing device, through which return line the medium flows back to the storage vessel again. If the circuit is blocked by frozen medium in the region of the storage vessel, the medium flows via the additional fluid connection, in particular the bypass line, from the return line back into the feed line, from the feed line to the feed port of the dosing device, through the dosing device to the return port thereof, from the return port into the return line, and through the return line back to the additional fluid connection, in particular the bypass line. A permanent medium flow through the dosing device is thus maintained and can dissipate heat in the region thereof, such that the dosing device is not thermally overloaded.

Also, a supply system may be characterized in that a pump for delivering the medium is arranged in the feed line, wherein the pump is arranged downstream of the point at which the additional fluid connection opens out into the feed line. Alternatively or in addition, a pump for delivering the medium may be arranged in the return line, wherein the pump is arranged upstream of the point at which the additional fluid connection opens out into the return line. In a normal operating state, the medium can be delivered from the storage vessel to the dosing device and back into the storage vessel again by the pump. However, if the circuit of the medium is blocked in the region of the storage vessel, it is possible, owing to the arrangement of the pump upstream of the point at which the additional fluid connection opens out into the return line or downstream of the point at which the additional fluid connection opens out into the feed line, for a media flow to be conveyed along a circuit which is completed by the additional fluid connection bypassing the storage vessel.

Also, a supply system may be characterized in that the additional fluid connection opens out into the return line directly upstream of the storage vessel and opens out into the feed line directly downstream of the storage vessel. Altogether, the additional fluid connection is arranged in the direct vicinity of the storage vessel. This means in particular that no further elements of the supply system, in particular no pump, no dosing device and no branch to the dosing device, are arranged between the storage vessel and the opening-out points of the additional fluid connection. In particular, a path distance from an outlet and an inlet of the storage vessel for the medium, or from connectors of the provision line at the storage vessel, to the points at which the additional fluid connection opens out into the feed line, on the one hand, and into the return line, on the other hand, is as short as possible in order that the circuit for the medium bypassing the storage vessel is completed as close as possible to the storage vessel. In this case, however, the distance may be great enough that blockage of the opening-out points of the additional fluid connection by a frozen medium in the region of the storage vessel is avoided, and/or such that frozen medium in the opening-out region thaws out very much more quickly than the frozen medium arranged in the storage vessel, such that adequate cooling of the dosing device is ensured in good time before the occurrence of thermally induced damage.

Also, a supply system may be characterized in that the additional fluid connection is provided by at least one T-piece. In this case, the at least one T-piece is part of the feed line. Alternatively or in addition, a T-piece is provided which is part of the return line. If a T-piece is provided, then in effect, the long limb of the T provides the additional fluid connection, whereas the transverse limb is part of the feed line or of the return line. If two T-pieces are provided, these may be connected to one another in the region of the ends of their long limbs, wherein these provide the additional fluid connection. The transverse limb of one T is in this case part of the feed line, whereas the transverse limb of the other T is part of the return line. This results altogether in a substantially H-shaped configuration of that section of the provision line which has the additional fluid connection.

Also, a supply system may be characterized in that a section of the provision line directly facing the storage vessel is of H-shaped form. In this case, a first limb of the H is part of the feed line. A second limb, parallel to the first limb, of the H is part of the return line. The additional fluid connection is provided by a third limb, arranged transversely with respect to the first and second limbs, of the H. In this case, the expressions “parallel” and “transversely” refer not necessarily to spatial geometric orientations but rather to fluidic interconnections, that is to say in particular an arrangement of parallel and antiparallel flows and transverse flows, with antiparallel flows in the region of the feed line and of the return line and a transverse flow in the region of the additional fluid connection. In an exemplary embodiment, however, it is provided that that section of the provision line which faces the storage vessel is actually also of H-shaped form in spatial geometric terms, with two limbs which are at least substantially parallel to one another and of which a first is part of the feed line and a second is part of the return line, wherein a limb arranged transversely, in particular perpendicular, with respect thereto provides the additional fluid connection. This corresponds substantially to the configuration that can be produced by the connection of two T-pieces at the ends of their long limbs.

In one exemplary embodiment, it may be the case that that section of the provision line which directly faces the storage vessel is in the form of an H-shaped connector piece which, in the region of one end of the parallel limbs, is connected to the connectors of the storage vessel, and in the region of the opposite ends of the parallel limbs, is connected to that part of the feed line which leads to the dosing device, on the one hand, and to that part of the return line which leads from the dosing device, on the other hand. It may be the case that prefabricated connectors, in particular plug-type connections, are provided on the H-shaped connector piece. It is possible for the connector piece to be of unipartite form. In another exemplary embodiment, it is provided that the connector piece is made up of two T-pieces or is formed from separate parts in some other way.

A supply system may be characterized in that the provision line is designed such that it can be heated at least in regions. In this case, the provision line is particularly designed such that it can be heated at least in the region of the H-shaped section. By heating the provision line, it is possible, in the presence of low ambient temperatures, for medium that has frozen in the provision line to be rapidly thawed out after the start-up of the supply system, thus ensuring firstly that the medium is injected into an exhaust line as quickly as possible after the starting of the internal combustion engine, and secondly that the dosing device is cooled quickly and efficiently in order to prevent damage owing to thermal loading by hot exhaust gas. In one exemplary embodiment, it may be provided that only the feed line is designed such that it can be heated at least in regions. In a further exemplary embodiment, it is possible for only the return line to be designed such that it can be heated at least in regions. In another exemplary embodiment, it is possible for both the feed line and the return line to be designed such that they can be heated at least in regions. Alternatively or in addition, it is possible for the additional fluid connection to be designed such that it can be heated. In particular, it is possible for a substantially H-shaped connector piece which comprises the additional fluid connection to be designed such that it can be heated.

For the heating of the provision line, it is possible for an electric heating device to be provided. In particular, it is possible for a heating wire to be wound around the provision line in regions. Alternatively or in addition, it is possible for a device to be provided by means of which the provision line can be heated by means of cooling water of the internal combustion engine. Regardless of the design of the heating device, it may have a heating power of 25 watts per meter.

A supply system is also possible which is characterized in that a throttle device or a pressure-maintaining device is arranged in the additional fluid connection. Such a device may have the effect that at least a major part of the medium that is conducted in the circuit flows through the additional fluid connection only when the connection between feed line and return line in the region of the storage vessel is actually blocked by frozen medium. By contrast, if the circuit at least also via the storage vessel is closed, it may be the case that at least the major part, particularly possibly all, of the medium that is conducted in the circuit flows via the storage vessel.

The throttle device may therefore be designed such that a flow cross section along the additional fluid connection is smaller than a flow cross section along a fluid path through the storage vessel, as long as the fluid path is not at least partially blocked by frozen medium.

The throttle device may comprise a region with reduced line cross section. In an exemplary embodiment, a line cross section upstream and downstream of the region with reduced line cross section is 2.0 mm, wherein the cross section in the region with reduced line cross section is reduced to 1.5 mm, possibly to 1.0 mm.

In another exemplary embodiment, the region with reduced line cross section is arranged in the long limb of a T-piece.

Alternatively or in addition, it may be provided that the throttle device comprises an adjustable throttle element. It is possible for a flow cross section through the additional fluid connection to be varied by means of the adjustable throttle element. In particular, it is possible for the flow cross section of the additional fluid connection to be enlarged when a fluid path through the storage vessel is blocked by frozen medium. By contrast, if the fluid path is free, in particular when the medium has completely thawed out, the flow cross section of the additional fluid connection can be reduced in order to ensure that a major part of the medium that is conducted in the circuit flows through the storage vessel. In particular, it may be provided that the additional fluid connection can be completely blocked by the adjustable throttle element. This functionality corresponds to the function of a pressure-maintaining device. In one exemplary embodiment, it is provided that the adjustable throttle element is in the form of a valve.

The adjustable throttle element can be actuated by a control unit, in particular an engine control unit of an internal combustion engine.

If a pressure-maintaining device is provided in the additional fluid connection, the pressure-maintaining device may be designed such that it is closed, that is to say blocks the additional fluid connection, when a normal pressure prevails in the return line, which normal pressure lies below a pressure setpoint value of the pressure-maintaining device and prevails when the fluid path via the storage vessel is not blocked. If the connection between feed line and return line in the region of the storage vessel is blocked by frozen medium, the pressure in the return line increases. The pressure setpoint value of the pressure-maintaining device may be selected such that the pressure in the return line and thus also in the additional fluid connection upstream of the pressure-maintaining device in this case exceeds the pressure setpoint value, wherein the pressure-maintaining device opens up the additional fluid connection. The pressure-maintaining device blocks the additional fluid connection again when the pressure setpoint value is undershot.

The pressure-maintaining device may be in the form of a pressure-maintaining valve. It is particularly possible for the pressure-maintaining device to be actuated by a control unit, in particular an engine control unit of an internal combustion engine, wherein the pressure setpoint value can be varied by means of the control unit.

A supply system may also be characterized in that it is designed for introducing a reducing agent into an exhaust line of an internal combustion engine. It is provided here that the supply system has a reducing agent in the storage vessel of the supply system.

Finally, a supply system is possible which is characterized in that it is designed for dosing a urea solution, in particular an aqueous urea solution, into an exhaust line of an internal combustion engine. In this case, it is particularly provided that a urea solution, in particular an aqueous urea solution, is arranged in the storage vessel of the supply system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein:

FIG. 1 is a schematic illustration of an exemplary embodiment of a supply system.

Corresponding reference characters indicate corresponding parts throughout the single view. The exemplification set out herein illustrates one embodiment of the invention and such exemplification is not to be construed as limiting the scope of the invention in any manner.

DETAILED DESCRIPTION OF THE INVENTION

FIG. 1 is a schematic illustration of an exemplary embodiment of a supply system 1, which serves for the supply of a reducing agent, in particular an aqueous urea solution, into an exhaust line 3 of an internal combustion engine (not illustrated).

The supply system 1 has a storage vessel 5 for the medium and has a dosing device 7 by means of which the medium can be dosed into the exhaust line 3 upstream of a selective catalytic converter.

The supply system 1 furthermore comprises a provision line 9 which comprises a feed line 11 through which the medium can be delivered to the dosing device 7. The medium can be conveyed from the dosing device back into the storage vessel 5 through a return line 13. In the exemplary embodiment illustrated, the dosing device 7 has a cooling jacket 15 into which the feed line 11 opens out in the region of a feed port 17. The cooling jacket 15 furthermore has a return port 19 through which the medium can flow into the return line 13. From the feed line 11, the medium thus flows through the feed port 17 into the cooling jacket 15 and emerges from the latter into the return line 13 through the return port 19. In this way, heat is transported away from the dosing device 7 by the medium flowing through the cooling jacket 15, such that the dosing device is cooled in order to prevent damage as a result of overheating in particular by the hot exhaust gas flowing in the exhaust line 3.

In the exemplary embodiment illustrated, a branch line 21 is provided which is fluidly connected at one side to the return line 13 and at the other side to the dosing device 7 such that medium can be supplied to the dosing device 7 through the branch line 21, which medium is ultimately injected into the exhaust line 3. In other words, the dosing device 7 doses the medium into the exhaust line 3 of the internal combustion engine. The dosing device 7 may, for example, be in the form of a doser.

In an alternative exemplary embodiment, it is provided that there is a corresponding branch line to the feed line 11. In a further alternative exemplary embodiment, it is provided that the medium for being dosed in is extracted from the cooling flow, in particular the cooling jacket 15, in the interior of the dosing device 7, such that in this case, in effect, an internal branch line is provided.

It may be the case that the volume of medium dosed into the exhaust line 3 per unit of time is small in relation to the medium flow which is conducted in the circuit and which in addition also flows through the dosing device 7, in particular through the cooling jacket 15 for cooling purposes. Thus, only a fraction of the cooling medium flow is extracted for actual injection into the exhaust line 3.

It can be seen that, during the operation of the supply system 1, medium is conveyed from the storage vessel 5 via the feed line 11, through the cooling jacket 15 and through the return line 13 back to the storage vessel 5. If, in the presence of low temperatures, the medium has frozen, it must initially be thawed out again at least in regions before the supply system 1 can function as intended. For this purpose, the provision line 9 is designed such that it can be heated at least in regions. Here, it is evident that the medium arranged in the provision line 9 and also in the dosing device 7 can be thawed out relatively quickly owing to the relatively small volume thereof, whereas the very much larger medium volume in the storage vessel 5 takes very much longer to thaw out. This is the case even if the storage vessel 5 is also designed such that it can be heated at least in regions.

Therefore, an operating state may arise in which, although thawed medium can be injected via the branch line 21 through the dosing device 7 into the exhaust line 3, the media circuit for the cooling of the dosing device 7 is however at the same time blocked by frozen medium arranged in the storage vessel 5. It may then be the case that adequate cooling of the dosing device 7 is not possible, with the result that the dosing device may possibly be damaged as a result of overheating.

To prevent this, an additional fluid connection 23 is provided which connects the provision line 9 to the return line 13 upstream of the feed port 17 and downstream of the return port 19. The additional fluid connection 23 is in the form of a bypass line 25 through which the medium can be delivered along the provision line 9 so as to bypass the storage vessel 5. It is thus possible for the medium to be conveyed in the circuit for the purposes of cooling the dosing device 7 even when the storage vessel 5 is blocked. It is essential here that only a small amount of medium is extracted by the branch line 21 for dosing into the exhaust line 3, because otherwise the circuit would quickly run dry before the medium in the storage vessel 5 has thawed. Conversely, the volume of the provision line 9 including the cooling jacket 15 is selected such that adequate dosing of medium into the exhaust line 3, on the one hand, and adequate cooling of the dosing device 7, on the other hand, are ensured up until the time at which the storage vessel 5 is no longer blocked by frozen medium.

In the exemplary embodiment illustrated, a pump 27 is arranged in the feed line 11, which pump is arranged downstream of the point at which the additional fluid connection 23 opens out into the feed line 11. Thus, by means of the pump 27, the medium can be conveyed in the circuit, for the purposes of cooling the dosing device 7, both via the storage vessel 5 and bypassing the latter. Alternatively or in addition, a pump 45 for delivering the medium may be arranged in the return line 13, wherein the pump 45 is arranged upstream of the point at which the additional fluid connection 23 opens out into the return line 13.

The storage vessel 5 has an outlet 29 and an inlet 31 for the medium. It can be seen that the additional fluid connection 23 or the bypass line 25 connects the outlet 29 to the inlet 31 in the vicinity of the storage vessel 5, in particular at the storage vessel 5. In particular, the additional fluid connection 23 can be arranged directly in the region of the storage vessel 5, which means that no further elements of the supply system 1 are arranged between the additional fluid connection 23 and the storage vessel 5. The additional fluid connection 23 is particularly arranged as close as possible to the storage vessel 5, or the opening-out points of the additional fluid connection are arranged as close as possible to the outlet 29 and the inlet 31, wherein the corresponding distances are configured so as to virtually rule out the possibility of the points at which the additional fluid connection 23 opens out into the feed line 11 at one side and into the return line 13 at the other side being blocked by frozen medium in the region of the outlet 29 and of the inlet 31.

In the exemplary embodiment illustrated, a section of the provision line 9 directly facing the storage vessel 5, which section extends as far as a dash-dotted line 33, is of H-shaped form. The region can be in the form of a separate connector piece 35 which can be connected by way of connectors, in particular plug-type connections, to the outlet 29 and to the inlet 31 at one side and to the feed line 11 and to the return line 13 at the other side. It is possible for the connector piece 35 to be of unipartite form. In another exemplary embodiment, it is possible for the connector piece 35 to be made up in particular of two T-pieces which are fluidly connected to one another in the region of long limbs, or to be made up of separate parts in some other way. The connector piece 35 particularly comprises an electric heating device by means of which it can be heated for the purposes of thawing out medium. For the heating of the provision line 9, it is possible for an electric heating device 47 to be provided. Alternatively or in addition, it is possible for a device 49 to be provided by means of which the provision line 9 can be heated by means of cooling water of the internal combustion engine.

A first limb 37 of the H-shaped section forms a part of the feed line 11. A second limb 39 which is oriented parallel to the first limb 37 forms a part of the return line 13. Finally, a third limb 41 which is oriented perpendicular to the first limb 37 and to the second limb 39 provides the additional fluid connection 23 or the bypass line 25.

In the additional fluid connection 23 there is arranged a throttle device 43 which, in this case, is formed as a region of reduced line cross section. In this case, the flow cross section through the reduced line cross section can be selected such that, when the circuit through the storage vessel 5 is opened up, that is to say not blocked, at least a major part of the medium that is conducted in the circuit flows not via the additional fluid connection 23 but via the storage vessel 5. By contrast, if the flow cross section of the fluid path through the storage vessel 5 has been constricted to a value smaller than the flow cross section in the region of the reduced line cross section, or has been blocked entirely, owing to frozen medium, a major part of the medium, or even all of the medium, flows along the additional fluid connection 23 through the throttle device 43.

It is alternatively possible for a pressure-maintaining device, in particular a pressure-maintaining valve, to be provided in the additional fluid connection 23 instead of the throttle device 43. Device 43 in FIG. 1 also serves to depict schematically the pressure-maintaining valve.

Altogether, it is evident that, with the aid of the supply system, effective cooling of the dosing device 7 can be ensured even when a medium circuit is blocked in the region of the storage vessel 5 by frozen medium. In this way, damage to the dosing device 7 as a result of thermal overloading during a thawing-out phase of the medium, in particular in the region of the storage vessel 5, can be prevented in an effective manner.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A supply system for an exhaust-gas purification apparatus for the treatment of exhaust gases of an internal combustion engine having an exhaust line, said supply system comprising:

a storage vessel for a medium;

a doser for dosing the medium into the exhaust line of the internal combustion engine, including:

a cooling jacket;

a feed port; and a return port, wherein the doser is designed such that, during the operation of the supply system, flow can pass through said cooling jacket from the feed port to the return port of the doser for the purpose of cooling said doser; and a provision line, including:

a feed line for the supply of the medium to the doser;

a return line for returning the medium from the doser into the storage vessel;

a branch line fluidly connected to said return line and to said doser such that the medium is supplied to the doser through said branch line; and an additional fluid connection between the feed line and the return line, wherein the additional fluid connection opens out into the feed line upstream of the feed port of the doser and opens out into the return line downstream of the return port of the doser, said additional fluid connection configured for receiving said medium therethrough when said storage vessel is blocked by a frozen said medium, and wherein only a small amount of said medium is extracted by said branch line for dosing into the exhaust line such that adequate dosing of said medium into the exhaust line and adequate cooling of said doser are ensured until said storage vessel is no longer blocked by said frozen said medium.

2. The supply system of claim 1, wherein said additional fluid connection is formed as a bypass line through which the medium can be delivered along the provision line so as to bypass the storage vessel.

3. The supply system of claim 1, wherein a pump for delivering the medium is arranged in the feed line, wherein the pump is arranged downstream of the point at which the additional fluid connection opens out into the feed line.

4. The supply system of claim 1, wherein a pump for delivering the medium is arranged in the return line, wherein the pump is arranged upstream of the point at which the additional fluid connection opens out into the return line.

5. The supply system of claim 1, wherein said additional fluid connection opens out into the return line directly upstream of the storage vessel and opens out into the feed line directly downstream of the storage vessel.

6. The supply system of claim 1, wherein said additional fluid connection is provided by at least one T-piece, wherein the at least one T-piece is part of at least one of the feed line and the return line.

7. The supply system of claim 1, wherein a section of the provision line directly facing the storage vessel is of an H-shaped form, said H-shaped form including a first limb, a second limb and a third limb, wherein said first limb is part of the feed line, wherein said second limb, parallel to said first limb, is part of the return line, and said third limb, arranged transversely with respect to said first and second limbs, provides said additional fluid connection.

8. The supply system of claim 7, wherein said provision line is designed such that it can be heated at least in regions, wherein an electric heating device is provided.

9. The supply system of claim 1, wherein a throttle device is arranged in the additional fluid connection, wherein the throttle device includes at least one of a region with a reduced line cross section and an adjustable throttle element.

10. The supply system of claim 1, wherein a pressure-maintaining device is arranged in the additional fluid connection, wherein the pressure-maintaining device is in the form of a pressure-maintaining valve.

11. The supply system of claim 1, wherein said supply system is designed for introducing a reducing agent into said exhaust line of the internal combustion engine, wherein the reducing agent is arranged in said storage vessel.

12. The supply system of claim 11, wherein the supply system is designed for dosing a urea solution into said exhaust line of the internal combustion engine, wherein the supply system has a urea solution, in the storage vessel.

13. The supply system of claim 8, wherein said regions includes a region of the H-shaped section, said provision line being designed such that it can be heated in said region of the H-shaped section.

14. The supply system of claim 12, wherein the urea solution is an aqueous urea solution.

* * * * *